United States Patent [19]
Kershaw, Jr.

[11] Patent Number: 6,021,719
[45] Date of Patent: Feb. 8, 2000

[54] MOBILE TRACK VEHICLE

[76] Inventor: Royce G. Kershaw, Jr., P.O. Box 244100, Montgomery, Ala. 36124-4100

[21] Appl. No.: 08/967,567

[22] Filed: Nov. 10, 1997

[51] Int. Cl.$^7$ .............................. B61F 13/00; B61D 15/00
[52] U.S. Cl. ........................................................... 105/72.2
[58] Field of Search ................................ 105/72.2, 215.1, 105/215.2, 28; 180/24.11, 24.12, 24.08, 209; 280/763.1, 766.1; 104/35, 44

[56] References Cited

U.S. PATENT DOCUMENTS

| | | | |
|---|---|---|---|
| 2,157,651 | 5/1939 | Fildes | 105/215.2 |
| 2,699,222 | 1/1955 | Doorne | 180/24.11 |
| 3,130,686 | 4/1964 | Fiechter et al. | 105/72.2 |
| 3,392,681 | 7/1968 | Bryan | 105/28 |
| 4,520,735 | 6/1985 | Field | 105/215.2 |
| 5,016,544 | 5/1991 | Woollam | 105/72.2 |
| 5,103,740 | 4/1992 | Masse | 105/72.2 |
| 5,619,931 | 4/1997 | Madison | 105/72.2 |
| 5,802,980 | 9/1998 | Hofmiller | 105/72.2 |

FOREIGN PATENT DOCUMENTS 2212125  7/1989  United Kingdom ................. 105/72.2

*Primary Examiner*—Mark T. Le
*Attorney, Agent, or Firm*—Robert J. Veal; Kenneth M. Bush

[57] ABSTRACT

An improved self-propelled mobile track vehicle (MTV) capable of traveling by road at normal highway speeds and traveling by rail after conversion at a narrow railroad crossing by producing a device for rotating the vehicle 90 degrees. The vehicle is powered by a diesel engine driving through a power shift transmission to the roadway and railway axles. A significant advantage over other types of road/rail vehicles is that 100 percent of the vehicle's weight is carried on the rail wheels, which are powered and braked, thereby allowing higher and safer rail speeds. One way to convert the vehicle from roadway travel to railway travel is to maneuver it into a position parallel to the track at a road crossing. The rail axles are then extended and road axles retracted. In addition, a turntable mounted at the vehicle's center of gravity also allows the vehicle to convert at a narrow road crossing. While at railway/roadway crossing the unit raises and rotates 90 to align with the desired roadway or railway. The vehicle can assist in starting a train by extending the powered road axle so that the inner rubber tires contact the rail and the high traction of rubber on rail assists in increasing starting traction of the vehicle thus allowing the vehicle to assist in starting a train.

6 Claims, 4 Drawing Sheets

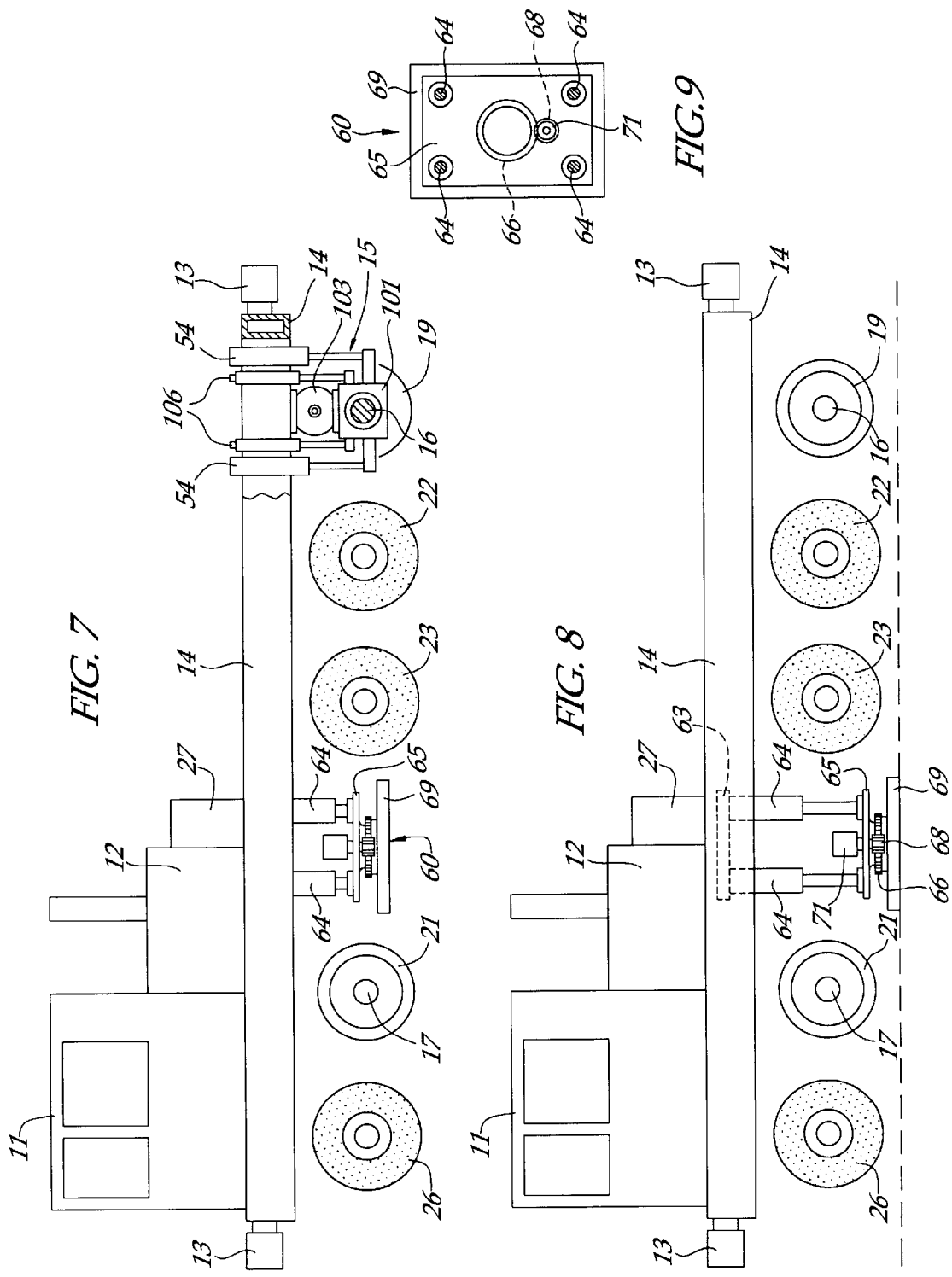

MOBILE TRACK VEHICLE

FIELD OF INVENTION

The present invention generally relates to railway and roadway self-propelled vehicles. More particularly, it relates to an improved self-propelled mobile track vehicle (MTV) capable of traveling by road at normal highway speeds and traveling by rail after conversion at a narrow railroad crossing by producing a means for rotating the vehicle ninety degrees.

BACKGROUND OF INVENTION

Self-propelled vehicles which are operable on either roadways or highways are widely known and used in the rail industry. For instance, U.S. Pat. No. 3,019,742 discloses a universal mobile unit for self propulsion on either highways or railways which embodies a source of power for motivation of various instrumentalities and one in which is so constructed and arranged as to provide for the selective attachment, support and conveyance of such various types of maintenance equipment so the one unit may be universally applicable for carrying out a wide variety of maintenance and construction operations. Moreover, such inventions are embodied in units which also include means by which the railway wheels and/or the roadway engaging wheels may be selectively rotated for propulsion or by which they may be synchronously rotated together to provide dual traction. Such prior art units also provide for the application of roadway tires to a railway rail whereby the inherent superior tractive effect of conventional rubber treads may be applicable in the movement of the unit on railway rails while the railway wheels engage the rails to preclude lateral displacement of the unit from the rails.

There are also prior art units such as the Fairmont-Series 4072 Heavy-Duty Guide Wheel equipment which is designed for crane carriers and special-purpose heavy-duty truck applications. The tandem bogie-type guide wheel unit features coil spring suspension, brakes on all wheels, positive mechanical latches in both rail and roadway positions, and fill hydraulic control of raising and lowering the guide wheels. Units such as the Fairmont-Series 4072 require the vehicle to maneuver to a position parallel to the railway or roadway to make the desired conversion.

However, prior art road and rail vehicles lack the ability to allow the roadway to railway conversion absent placing the vehicle parallel to the desired railway or roadway. Moreover, narrow road crossings present prior art vehicles with increasingly difficult maneuverability problems. Accordingly, there exists a need for a vehicle which has improved operational characteristics which will not require placing the vehicle in the parallel position. Moreover, there exists a need for a vehicle which has improved operational characteristics thereby allowing it to convert from the roadway to the railway position at narrow crossings which would create conversion problems otherwise.

SUMMARY OF INVENTION

It is an object of the present invention to produce an improved self-propelled mobile track vehicle (MTV) capable of traveling by road at normal highway speeds and converting to rail travel at a road crossing.

Another object of the present invention is to produce a significant advantage over other types of road/rail vehicles by producing a system which when it is in rail travel configuration, 100 percent of the vehicle's weight can be carried on the rail wheels which are powered and braked thereby allowing higher and safer rail speeds.

It is also an object of the present invention to produce a vehicle which provides enhanced operability when converting from road to rail by maneuvering into a position parallel to the track at a road crossing or a yard.

Still another object of the present invention is to produce a mounted turntable mounted at the center of gravity of the vehicle which allows the vehicle to convert at a narrow road crossing.

It is also an object of the present invention to increase the starting traction by extending the concomitantly powered road axle so that the inner rubber tires contact the rail and the high traction of rubber on rail can assist in overcoming the inertial resistance of a massive body at rest such as a train or string of cars.

These and other features and advantages of the invention are accomplished by the unique combination of features which are utilized to provide motive power to the drive wheels and to maneuver the vehicle selectively between road and track. More specifically, the present invention utilizes a single transmission to couple the engine to the drive wheels and a single output drive shaft which is coupled to both the driven road wheels and driven rail wheels through a pass through differential and a terminal differential respectively. Accordingly, superior performance, particularly at starting is achieved because both sets of drive wheels may be employed for concomitant rotation. Further track to road conversion is readily accomplished through the use of a pedestal type lift which allows the vehicle to be rotated about a vertical axis to a position displaced by ninety degrees.

BRIEF DESCRIPTION OF DRAWINGS

An improved self-propelled mobile track vehicle (MTV) incorporating the features of the invention is depicted in the attached drawings which form a portion of the disclosure and wherein:

FIG. 7 is a side view showing the vehicle and actuators for extending and retracting the wheels.

FIG. 8 is a side view showing the means for rotating the mobile track vehicle.

FIG. 9 is a top plan view showing the ring gear, the actuators, the pinion gear, and the turntable.

DESCRIPTION OF PREFERRED EMBODIMENT

Figure 1:
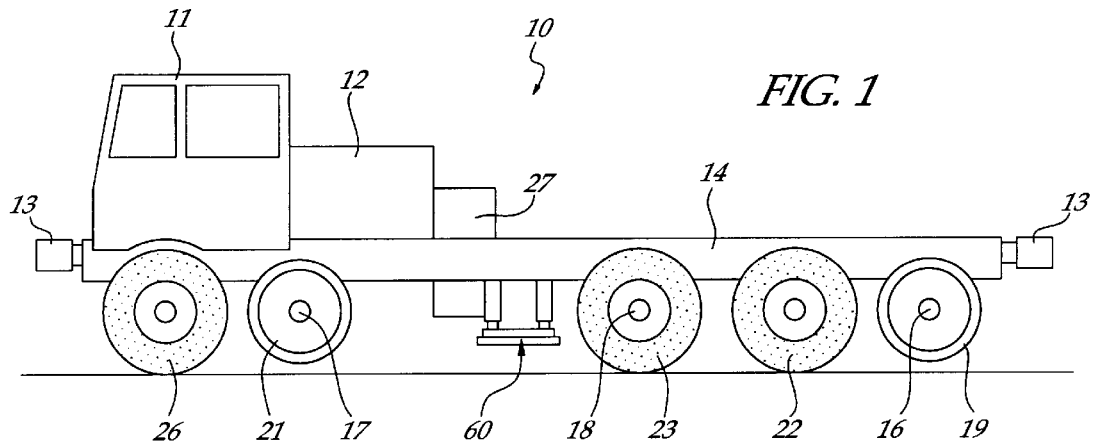
FIG. 1 is a side elevational view showing the MTV with the power road wheels extended and the power rail wheels retracted for road travel.
Figure 2:
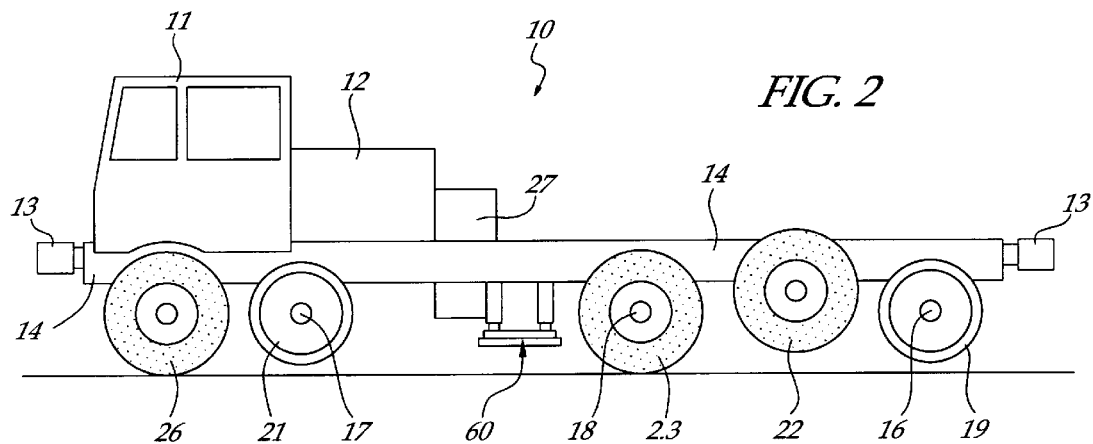
FIG. 2 is a side elevational view showing the non-powered road wheels raised.
Figure 3:
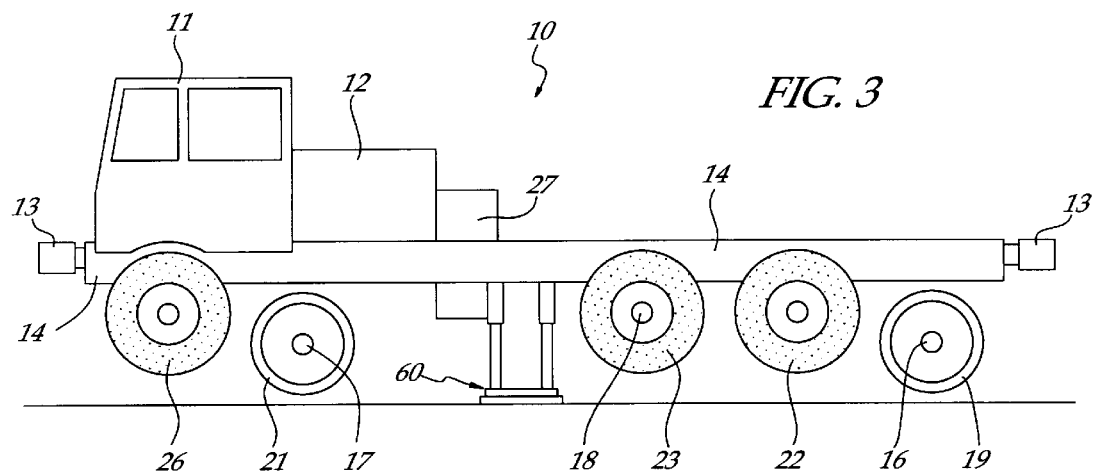
FIG. 3 is a side elevational view showing the MTV being raised and rotated ninety degrees by the mounted turntable.
Figure 4:
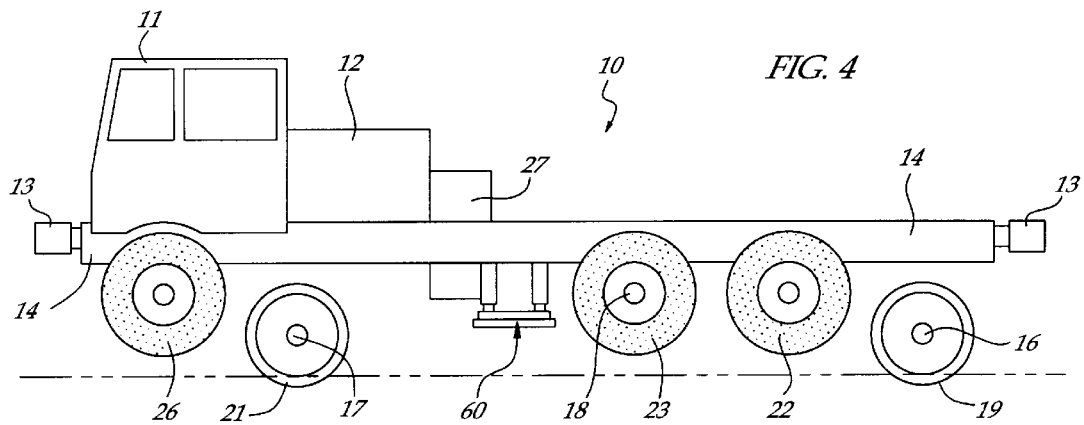
FIG. 4 is a side elevational view showing the MTV with the rail wheels extended and the powered road wheels retracted for rail travel.
Figure 5:
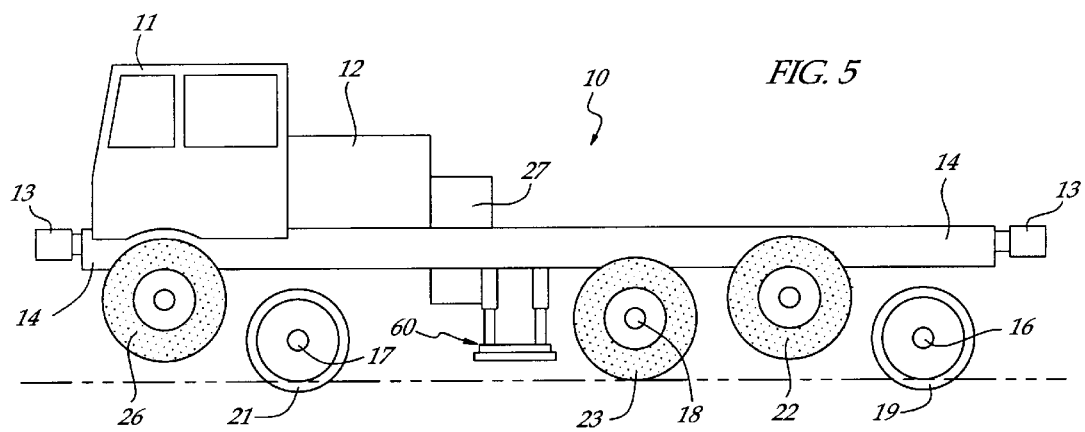
FIG. 5 is a side elevational view showing the MTV with rail the rail wheels and powered road wheels extended for rail travel.
Figure 6:
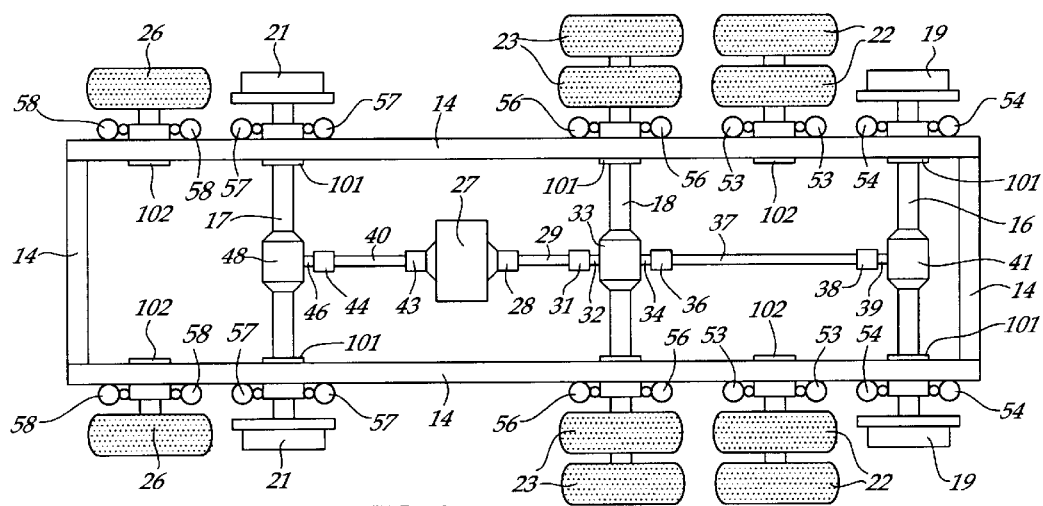
FIG. 6 is a top plan view showing the powershift transmission, the chassis, and the drive means.

Referring to the drawings for a better understanding of the function and structure of the invention, it may be seen that the improved self-propelled mobile track vehicle (MTV) is indicated generally by the number 10 as shown in FIGS. 1–8. The mobile track vehicle may be in the general form of a conventional roadway truck 10 having a operator cab 11, a diesel engine 12, an automatic chassis coupler 13, a chassis 14, a suspension system indicated generally by number 15 connected to the chassis 14 which supports conventional rail wheel axles 16, 17 and powered road wheel axle 18. As shown in FIG. 6, it will be understood that this drive assembly is capable of simultaneously driving both the rail wheels 19, 21, and road wheels 23. Actuators 53, 54, 56, 57, 58 will allow the driver to selectively engage the rail wheels 19, 21 or the road wheels 22, 23, 26 or a combination of rail wheels and road wheels with the desired driving surface.

The means for selectively driving both the road wheels 23 and rail wheels 19, 21 includes a diesel engine 12 mounted to the top of the chassis 14, a powershift transmission 27 in engagement with the diesel engine 12 which transfers power to an inline series of drive shaft components including a first rear universal joint 28, a first propulsion shaft 29, a second rear universal joint 31, a first rear power shaft 32, coupled to a first rear differential gear 33, which drives a powered rear road axle 18, and a pair of powered road wheels 23. It is ostensibly noteworthy to mention that the first rear differential gear 33 is preferentially a pass through differential gear.

Thus, the drive shaft components further include a second rear powershaft 34 which is engaged with a third rear universal joint 36 for coupling with a second rear propulsion shaft 37 which terminates at a fourth rear universal joint 38 for connection to a third rear power shaft 39 which engages a second rear differential gear 41 which drives a rear rail axle 16 to provide motive force to a pair of flanged rear rail wheels 19 which are connected to the distal ends of the rear rail axle 16.

A first front universal joint 43 is engaged with the powershift transmission 27 for connection to a front propulsion shaft 40 which engages a second front universal joint 44 for coupling with a front powershaft 46 which engages a front differential gear 48 for driving a pair of front rail axle 17 to provide motive force to a pair of flanged front railway wheels 21 connected to the distal ends of the rail wheel axle 17.

Figure 10:
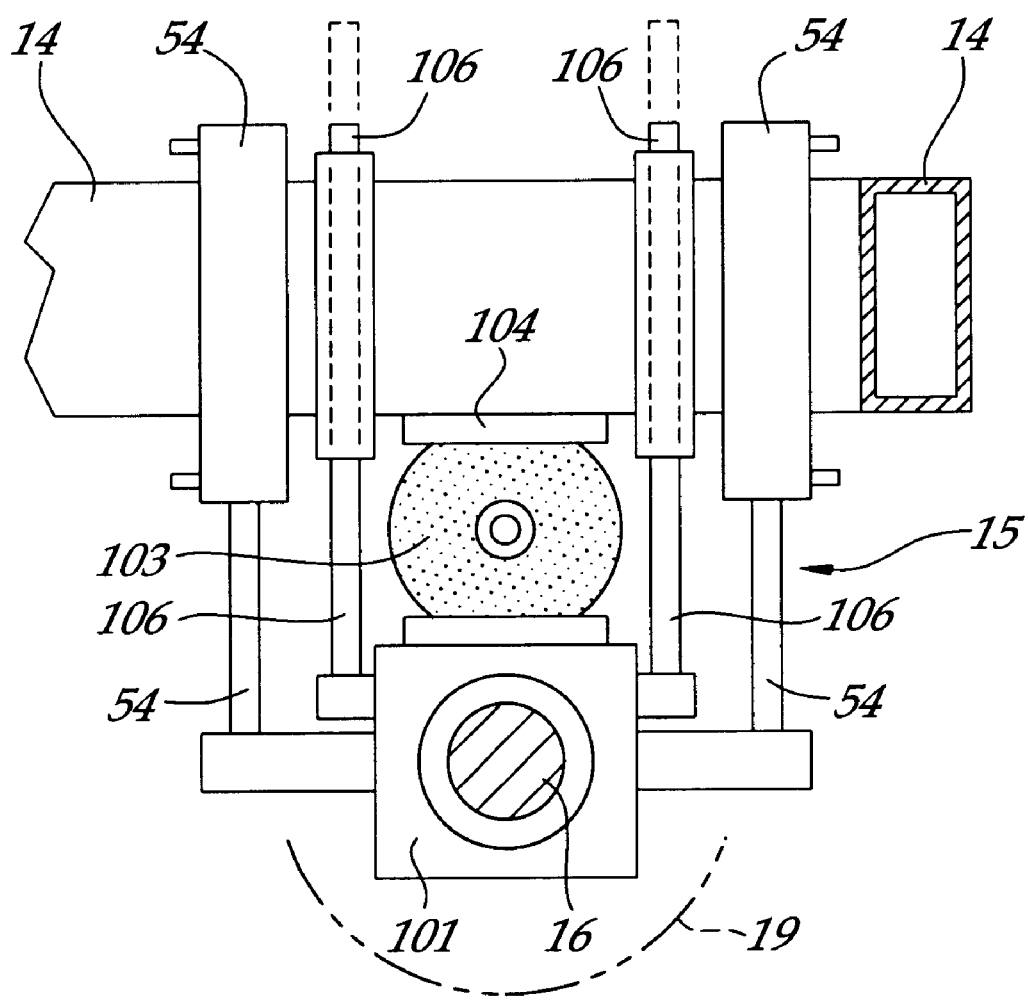
FIG. 10 is an enlarged view of the bogie and actuator (suspension).

As shown in FIG. 10 the suspension system is indicated generally by number 15. FIG. 10 shows that each driven axle is mounted in a lower bogie 101 which provides a conventional bearing arrangement for rotation of the driven wheels. Non-driven axles are mounted on similar bogies 102. Each bogie is attached to a superjacent hydraulic suspension bladder 103 that is selectively filled and evacuated to adjust the separation of the bogie from a frame attachment 104. That is to say bladder 103 is captured between bogie 101 and chassis 14 attachment 104 such that filling the bladder displaces the bogie and frame and evacuating the bladder allows the bogie and frame attachment to move toward one another. Bogie 101 and frame attachment 104 are also connected by a plurality of guide rods 106 which prevent excessive lateral displacement of the bogie. Likewise a plurality of acutators 53, 54, 56, 57, 58 are mounted on frame with the extension rods connected to bogies 101 such that the actuator extension rods are extended or retracted to position the bogie at a displaced position or a retracted position. When the acutator for a particular axle is extended, the associated bladder is filled and the frame is thus supported on the associated wheel at a maximum heigth relative to that axle. Accordingly, that axle and ground or rail engaging wheel is thus a weight bearing member. Likewise, the non-weight bearing members have the associated bladder deflated an appropriate amount and the associated actuator extension rods are retracted to lift the bogie, axle and wheel to a suitable height.

As shown in FIGS. 6 and 7, the plurality of Actuators 53, 54, 56, 57, 58 are for extending and retracting the road wheels 22, 23, 26 and rail wheels 19, 21 are suitably attached to the side of the chassis 14. The actuators have a first end fixedly attached to the chassis 14 and a distal end connected to the bogies 101 supporting the axles 16, 17, 18. Actuators 54, 57 are for extending and retracting the rail wheels 19, 21. Actuators 53, 56, 58 are for extending and retracting the road wheels 22, 23, 26. The actuators selectively extend and retract rail wheels 19, 21 and road wheels 22, 23, 26 depending upon the desired surface travel.

As shown in FIG. 8 and FIG. 9, the means for rotating the mobile track vehicle during conversion from roadway travel to railway travel is indicated in general by 60. A base 63 mounted beneath the chassis 14 extends downward to a plurality of actuators 64. The base 63 is mounted at the center of gravity of the mobile track vehicle for support and balance during rotation. The plurality of actuators 64 connect to the top of a horizontal plate 65. An actuator 71 mounted to the top of horizontal plate 65 drives a pinion gear 68 rotatably attached to the bottom of horizontal plate 65. The pinion gear 68 engages a ring gear 66 fixedly attached to the top of a turntable 69 and rotatably attached to the bottom of horizontal plate 65. Suitable bearing means (not shown) facilitates rotation of horizontal plate 65 in relation to ring gear 66. Turntable 69 has a diameter large enough to support and balance the weight of the mobile track vehicle as the rotation means 60 is lowered from a first position raised above the surface of the ground to a second position in engagement with the ground.

In operation, the disclosed mobile track vehicle provides a means for simultaneously driving both the rail wheels 19 & 21 and road wheels 22, 23, & 26. The plurality of actuators 53, 54, 56, and 58 mounted to the side of the chassis 14 selectively extend and retract the road wheels (non-powered road wheels 22, powered road wheels 23, and the steering wheels 26) and rail wheels 19, 21, for roadway or railway engagement.

In addition, the means for rotating the mobile track vehicle 60 and thereby converting from roadway to railway travel at a narrow road crossing and vice versa operates by extending the plurality of actuators 64 such that turntable 69 engages with the ground. Thereafter the force of the extending actuators lifts the mobile track vehicle from engagement with the ground thus allowing it to be rotated. Once the vehicle has been lifted, actuator 71 drives the pinion gear 68 which is engagement with the ring gear 66.

Thus, the pinion gear 68 and the horizontal plate 65 rotates about the fixed ring gear 66 and turntable 69. In turn, the rotation of horizontal plate 65 causes rotation of actuators 64 thereby causing the vehicle to rotate.

Moreover, the vehicle also provides enhanced starting traction by extending the powered road wheels 23 so that the inner rubber of said powered road wheels 22 can assist in powering the mobile track vehicle while attempting to start a train There has been disclosed heretofore the best embodiment of the present invention contemplated. However, it will be obvious to those skilled in the art that there may be modifications to the present invention without departing from this present invention in its broader scope.

What is claimed is:

1. An improved mobile track vehicle having a chassis, an operator cab, a means for supplying motive force, rail wheels and rail wheel axles, road wheels and road wheel axles, and a pair of steering road wheels mounted on said chassis for steering said mobile track vehicle during road travel, wherein the improvement comprises:

(a) means for simultaneously powering said road wheel axles and said rail wheel axles;

(b) an adjustable suspension including a plurality of actuators operatively mounted to said chassis for selective extension and retraction of said road wheels and said rail wheels, having a frame attachment, a plurality of bogies attached to said actuators, each of said bogies providing a conventional bearing arrangement for rotation of said driven wheels, a hydraulic suspension bladder operatively attached to the top of each of said bogies, and connected to selectively fill and evacuate, to adjust the separation of said bogie from said frame attachment thereby adjusting the height of said wheels associated with said bogie, a plurality of guide rods, operatively connected to said frame and each of said bogies for preventing lateral displacement of said bogies; and (c) means attached to said chassis for rotating said mobile track vehicle about a vertical axis from an initial position to a second position for selective alignment with either the roadway or railway.

2. The mobile track vehicle as defined in claim 1, wherein said adjustable suspension comprises a first plurality of actuators for said rail wheels and a second plurality of actuators for said road wheels for selective extension and retraction of said rail wheels and said road wheels.

3. The mobile track vehicle as defined in claim 2, further including a pair of rear driven dual road wheels connected to rear driven road wheel axles, wherein said rear driven road wheel axles extend so that the inner wheel of said rear driven dual road wheels engages the railway, thereby increasing starting traction.

4. An improved mobile track vehicle having a chassis, an operator cab, a means for supplying motive force, rail wheels and rail wheel axles, road wheels and road wheel axles, and a pair of steering road wheels mounted on said chassis for steering said mobile track vehicle during road travel, wherein the improvement comprises:

(a) means for simultaneously powering said road wheel axles and sail rail wheel axles;

(b) an adjustable suspension including a plurality of actuators operatively mounted to said chassis for selectively extending and retracting said road wheels and said rail wheels; and (c) means attached to said chassis for rotating said mobile track vehicle about a vertical axis from an initial position to a second position for selective alignment with either the roadway or railway including a base mounted beneath said chassis, said base mounted at the center of gravity of said mobile track vehicle, a plurality of hydraulic cylinders mounted operatively beneath said base, said hydraulic cylinders for lowering said means for rotating said mobile track vehicle from a first position raised above the surface of the ground to a second position in engagement with the ground, a horizontal plate mounted to the lower end of said plurality of actuators, a pinion gear rotatably attached to the bottom of said horizontal plate, said pinion gear for rotation of said horizontal plate thereby rotating said hydraulic cylinders so that such that said mobile track vehicle rotates therewith, a ring gear in engagement with said pinion gear, said ring gear for allowing revolution of said pinion gear around circumference thereof, a turntable fixedly attached beneath said ring gear, said turntable having diameter sufficient for supporting and balancing the weight of said mobile track vehicle, an actuator operatively mounted to the top of said horizontal plate extending though said horizontal plate in engagement with said pinion gear, said actuator for providing motive force for said pinion gear thereby rotating said pinion gear such that said mobile track vehicle rotates.

5. The mobile track vehicle as defined in claim 4, wherein said hydraulic cylinders lowers thereby extending said turntable in engagement with the ground thereby lifting said mobile track vehicle.

6. The mobile track vehicle as defined in claim 5, wherein said means for rotating said mobile track vehicle allows selective engagement with either the railway or the roadway.

* * * * *